United States Patent
Tornblad et al.

(10) Patent No.: US 6,875,067 B2
(45) Date of Patent: Apr. 5, 2005

(54) AXIALLY ADJUSTABLE THRUST BEARING FOR JET PROPULSION UNITS

(75) Inventors: Jens Tornblad, Kristinehamn (SE); Christer Häger, Kristinehamn (SE); Gunnar Styrud, Kristinehamn (SE)

(73) Assignee: Rolls-Royce Aktiebolag, Kristinehamn (SE)

(*) Notice: Subject to any disclaimer, the term of this patent is extended or adjusted under 35 U.S.C. 154(b) by 0 days.

(21) Appl. No.: 10/381,879

(22) PCT Filed: Sep. 27, 2001

(86) PCT No.: PCT/SE01/02080
§ 371 (c)(1),
(2), (4) Date: Mar. 31, 2003

(87) PCT Pub. No.: WO02/28706
PCT Pub. Date: Apr. 11, 2002

(65) Prior Publication Data
US 2004/0058595 A1 Mar. 25, 2004

(30) Foreign Application Priority Data
Oct. 2, 2000 (SE) ................................. 0003545

(51) Int. Cl.[7] .............................. B63H 23/34
(52) U.S. Cl. .................................. 440/83; 440/38
(58) Field of Search ...................... 440/38, 83

(56) References Cited

U.S. PATENT DOCUMENTS

| 5,366,396 A | 11/1994 | Schulze | 440/38 |
| 6,053,783 A | * 4/2000 | Brunn | 440/78 |

* cited by examiner

Primary Examiner—Ed Swinehart
(74) Attorney, Agent, or Firm—Michael Bednarek; Shaw Pittman LLP

(57) ABSTRACT

The present invention relates to a jet propulsion unit (1) for propulsion of a waterborne craft comprising at least one impeller pump (3) with a pump housing (4) in which an impeller shaft (22) or a journal (21) connected to said impeller shaft (22) is is rotatably journalled in bearings, and an impeller (7) blades (24), the impeller (7) being fixed to said impeller shaft (22) or journal (21) so as to follow the rotation of the impeller shaft (22), the impeller blades (24) being arranged at the impeller ( ) with a play of the blades (25) between each impeller blade (24) and the inside (15) of the pump housing (4). According to the invention the jet propulsion unit (1) also comprises an axially adjustable thrust bearing (27) arranged to cooperate with the impeller shaft (22) for adjusting said play (25).

23 Claims, 3 Drawing Sheets

AXIALLY ADJUSTABLE THRUST BEARING FOR JET PROPULSION UNITS

TECHNICAL FIELD

The present invention relates to a jet propulsion unit for propulsion of a waterborne craft comprising at least one impeller pump with a pump housing in which an impeller shaft or a journal connected to said impeller shaft is rotatably journalled in bearings, and an impeller, having impeller blades, the impeller being fixed to said impeller shaft or journal so as to follow the rotation of the impeller shaft, the impeller blades being arranged at the impeller with a play between each impeller blade and the inside of the pump housing.

STATE OF THE ART AND PROBLEM

Jet propulsion units, also named water jet- or impeller units, of the aforedescribed kind are known in many different designs and dimensions, from smaller units of about 500 kW up to large units of about 30 000 kW and more. Compared to a conventional propeller, a water jet unit has a method of propulsion that is to a great extent different. Instead of the conventional propeller it has a water pump or impeller pump, as it is called, mounted at the hull of the craft. The impeller pump comprises an impeller mounted within an enclosing, an impeller chamber, that is a part of a seawater flow tube at the same time. The impeller is attached to the end of a drive shaft, the impeller shaft, which is either the engine shaft of the craft or indirectly connected to said shaft. The purpose of the impeller is to pressure the seawater creating a very forceful water jet, from that the name jet propulsion unit.

The force of reaction that results from the water leaving the pump is used to propel the craft. The direction of rotation of the impeller is never changed but instead a separate "reversing device" is used for deflecting the direction of the water jet and thereby also the direction of the force of reaction, which then also changes the direction of the propulsion of the ship. A water jet unit has many advantages compared to a conventional propeller since an impeller pump has an efficiency of up to 90% and more at speeds over 25 knots. This results in higher speed of the craft at the same propulsion force or markedly lower fuel consumption at constant speed and lower propulsion force.

However, today there is still a big gap between on one hand fast but expensive airfreight and on the other hand cheaper but slower container freight by ship. Therefore, there is a desire to be able to build very large and very fast ocean-going ships for high-speed transports between for example USA and Europe and such ships would be equipped with very large water jet units. Such ships are estimated to reach average speed of 35 knots even at waves at the height of 7.5 meter and the present time of transport is estimated to be shortened by a third. To be able to bring about above mentioned ships, water jet units are needed that can reach at least 50 000 kW and that will have a diameter of intake of about 3.25 meter compared to the presently known largest diameter of 2.0 meter. The planned ships have units with a flow equivalent to about 500 m³ per second. It will be understood that enormous units are required to manage this capacity.

However, larger installations need a higher accuracy at the choice of the correct dimension of the water jet, both for achieving an optimised efficiency and for improvement of the fuel economy. Other common demands on the propulsion unit may be for example good manoeuvrability and also the ability to handle tough operation situations such as high sea. Several cooperating factors will decide how well the ship will adapt to the demands made on it.

By controlling the play between the impeller blades and the impeller chamber the risk that one runs of them contacting each other will be substantially reduced during normal operation, thus resulting in that a higher efficiency of the impeller may be obtained. Thus, the play between the impeller and the impeller chamber is of great importance to the propulsion output and since a bigger play reduces the efficiency of the impeller pump it is essential that the play is as small as possible. At a planned impeller pump the impeller blades will have a diameter of about 4.5 meters and the planned play between the impeller blades and the impeller chamber will amount to only about 4 millimetres. It is understood that e.g. temperature variations, entails problems that make it difficult to further reduce the play without the hazard of breakdowns. The damages that might be the result of the impeller contacting the enclosing are a serious problem. Such contact may be due to e.g. the vibrations or oscillations caused by cavitation. If, for this reason, the play instead is doubled, that is from about 0.1% of the diameter to 0.2%, the propulsion output will be reduced by about 1% which involves a not negligible increase in costs.

Because of the gains, calculated as a percentage, that can be obtained for each millimetre closer play that can be achieved, it is thus of utmost importance that the play normally can be kept with as narrow margins as possible. Of course, at the same time, the demand on the maximally admissible tolerance between the impeller and the enclosing will be very highly put forward. Furthermore, it is also true that the larger jet propulsion unit, the larger the demands on the tolerance between different parts will be made. If calculated as a percentage, the machine tolerances of an impeller are higher than those of a clockwork. For example, impeller blades with a diameter of up to 4500 millimetres are being turned and grinded with a precision of a few tenths of a millimetre. At speed of for example 40 knots, these small tolerances optimise the transformation of shaft-force into driving-force, prolonging the endurance and giving minimal vibrations and sound-levels.

However, one runs the risk that the oscillations and vibrations at some occasions, for example, when strange objects pass through the pump, will cause such a radial movement of the blades of the impeller that they will come in contact with the impeller chamber. The risk of damages that one runs will increase strongly at tough weather conditions, for example, at high sea one runs the risk of large acceleration or air suction through the pump. Also, the position of the impeller can be altered because of movements in the hull of the ship itself. The consequences of a breakdown of the jet propulsion unit during whole gale, in the middle of the Atlantic Ocean, could be serious.

Thus, it might be necessary to accept a somewhat reduced efficiency by increasing the play a little, at certain special situations. Since the impeller chamber and the impeller blades have a conical interface the play can be altered if the impeller is moved axially. Thus, it is an essential demand that, when necessary, the play between the impeller and the enclosing can be adjusted by axial movement of the impeller.

THE OBJECT AND CHARACTERISTICS OF THE INVENTION

It is an object of the present invention to accomplish such a jet propulsion unit for propulsion of ships, that makes it possible to substantially reduce or fully eliminate the risk of the blades of the impeller contacting the inner wall of the impeller chamber and to be able to make use of the favourable qualities of the jet propulsion unit in a better way than before and also at considerable larger ship dimensions than at the present conventional dimensions of ships. It is suggested, as a solution of the complex of problems, that the thrust bearings included are movably arranged. The movement is suitably done by using some sort of hydraulic piston arrangement, which also would contribute with a certain dampening function.

The jet propulsion unit according to the invention is characterized in that the jet propulsion unit also comprises an axially adjustable thrust bearing arranged to cooperate with the impeller shaft for adjusting said play.

According to further aspects of the jet propulsion unit according to the invention:

the thrust bearing comprises a bearing housing surrounding and encasing a bearing disc connected to or cooperating with the impeller shaft and said bearing housing being arranged axially movable by means of adjusting devices a distance sufficient for the play between the impeller blades and the inside of the pump housing to stay within the limits of a maximally and minimally admissible play of the blades.

rods are attached at a distance from and parallel with the shaft extending through the bearing housing and that the bearing housing is axially movable along the rods by means of guides.

the thrust bearing comprises a bearing housing fixed relative to the hull of the ship and surrounding and encasing a bearing disc connected to or cooperating with the impeller shaft the bearing disc being arranged to be axially adjustable by means of adjusting devices a distance sufficient for the play between the impeller blades and the inside of the pump housing to stay within the limits of a maximally and minimally admissible play of the blades.

the adjusting devices are mounted inside the bearing housing.

the adjusting devices comprise at least one hydraulic or pneumatic cylinder.

alternatively, some of or all the adjusting devices may be mechanical adjusting devices.

the bearing disc is a radially protruding part of the impeller shaft, the journal, or an intermediate shaft especially adapted for the thrust bearing and connected to the impeller shaft.

the bearing housing comprises one or several bearing supports.

the bearing supports comprise bearing surfaces consisting of e.g. Teflon segments, different composite materials, white metal and/or steel etc.

the adjusting devices are made of hydraulic or pneumatic cylinders that have a joint of pipe for compressed air and hydraulic oil respectively through one of the lateral surfaces of the bearing housing.

the maximally and minimally admissible play of the blades is determinated according to real or expected axial and/or radial changes of position of the impeller blades.

ADVANTAGES OF THE INVENTION

During normal operation, that is, in open sea, with small risk of strange objects being sucked in through the pump and during normal weather conditions, the play between the blades of the impeller and the impeller chamber may be set to a value that is very favourable for the ship's propulsion. If the conditions of operation would become worse the play can be increased temporarily, considerably reducing or fully eliminating the risk of unwanted wear etc.

DESCRIPTION OF DRAWINGS

The invention will be explained more in detail with reference to the attached drawings, wherein.

DETAILED DESCRIPTION OF THE INVENTION

Figure 1:
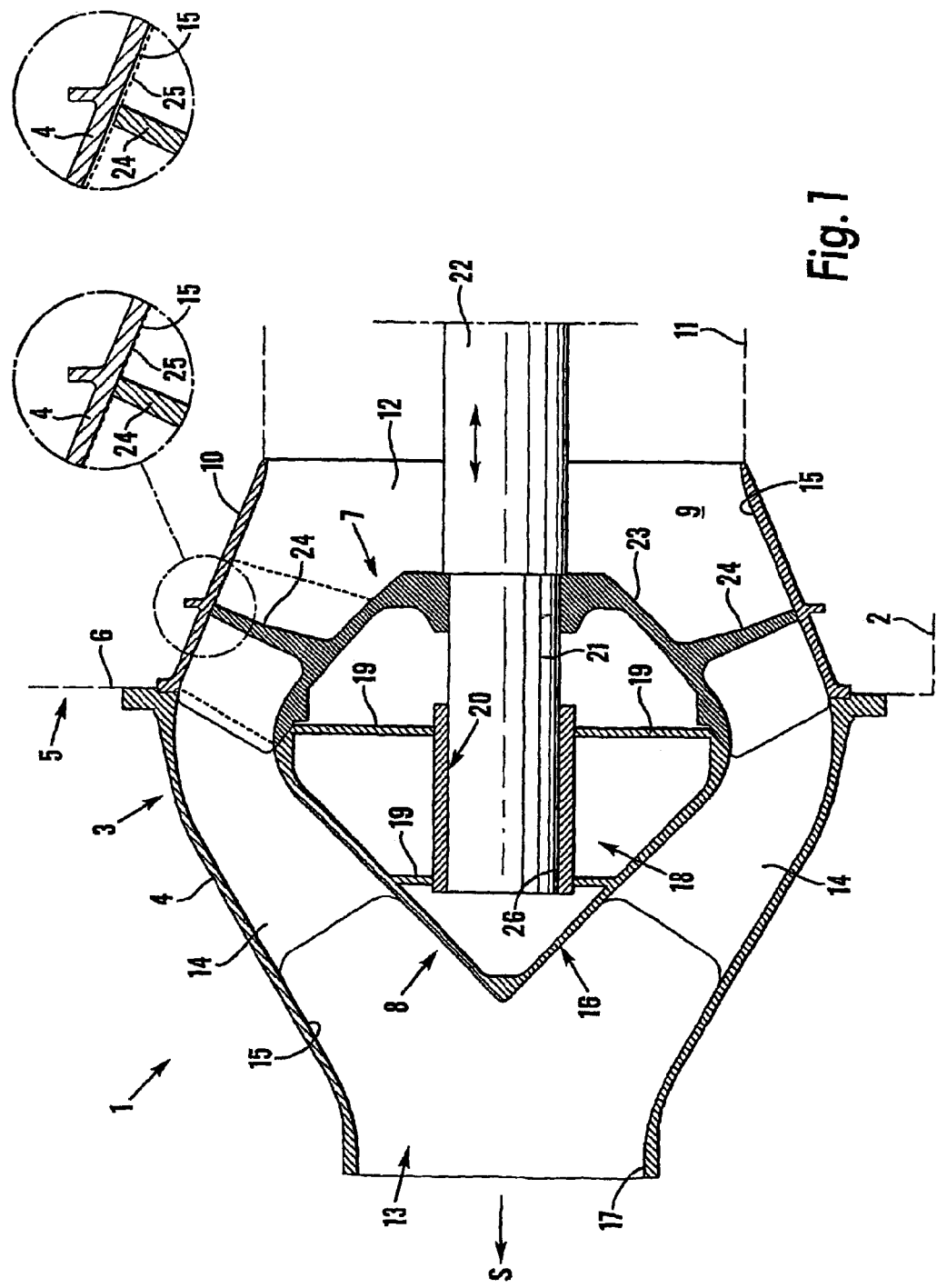
FIG. 1. is a schematic longitudinal section through parts of a jet propulsion unit for propulsion of a ship according to the present invention, the jet propulsion unit comprising an impeller moused at the end of an impeller shaft within an impeller chamber.

With reference to FIG. 1 it is shown schematically and as a longitudinal section parts of a jet propulsion unit 1 for propulsion of a ship. Being an integrated part of the hull of the ship 2, the jet propulsion unit 1 comprises an impeller pump 3 with a pump housing 4 composed of a front and a rear part and mounted in the stem part 5 of the hull of the ship 2 and usually at or alongside the transom stern 6 of the hull 2. Furthermore, the impeller pump 3 comprises an impeller 7 rotatably journalled at a hub housing 8 centrally and stationary mounted within an impeller chamber 9 within the impeller housing 4.

The impeller housing 4 and its impeller chamber 9 forms a tube section 10 that is expanded, conical and spherical and attached to a flow tube 11 for sea water. The flow tube 11 extends normally (not shown) in a curve obliquely upwardly from a water-inlet that is arranged beneath the load line of the ship and preferably but not necessarily at the bottom of the ship, further to the inlet opening 12 of the impeller chamber 9 and thereafter astern to a water outlet 13 at the transom stern 6. During operation of the impeller pump 3 a very forceful water jet S is created projecting through an outlet nozzle 17.

The hub housing 8 is firmly attached to the pump housing 4 by means of several guide rails 14 extending between the inside 15 of the pump housing 4 and the cone-shaped exterior 16 of the hub 8. Said cone 16 is pointing astern and forms together with the inside 15 of the pump housing 4 the outlet opening, i. e. the outlet-nozzle 17, of the impeller chamber 9.

Inside the cone-shaped hub 8 there is a bearing seat 18 firmly attached to the hub 8 via radial rods 19 and arranged to carry a bearing arrangement 20 that may comprise slide bearings or rolling bearings, including combinations of different types of bearings, e.g. spherical, conical or cylindrical thrust bearings and radial bearings. The hub 8 can be filled with a lubricant such as oil, thereby being sealed from penetrating water.

At the embodiment shown the impeller 7 is attached by a journal 21 to an impeller shaft 22, preferably at the end of the journal 21. Alternatively, the impeller 7 may be attached directly to the impeller shaft 22. The impeller shaft 22 extends inwardly through the wall of the flow tube 11 at said curve and her into the impeller chamber 9. The impeller shaft 22 constitutes either the outer end of the drive shaft of the ship or is indirectly connected to the drive shaft. As described above, the impeller shaft 22 or the journal 21 are rotatably journalled within the hub 8 of the pump housing 4 by means of said bearing arrangement 20.

The impeller 7 comprises a frustum of a cone 23 facing and attached to the impeller shaft 22 or its journal 21 in such a way that the cone part 23 follows the rotation of the impeller shaft 22. Thus, the stationary hub cone 16 and the impeller cone 23 that is rotatably arranged at the hub cone 16, form together a dome-shaped sphere, around which the pump housing 4 is shaped to form the likewise spherical impeller chamber 9. Several impeller blades 24 are arranged at the exterior of the frustum of a cone 23 for generating the water jet S that is directed astern. Each impeller blade 24 has such a position and such an extension, comprising length and angle, relative the impeller cone 23 that the distance, below named the play of the blades 25 (or play 25), between the outer periphery of each blade 24 and the inside 15 of the pump housing 4 normally becomes very small relative to the diameter of the impeller 7. For example, during normal operation, an impeller 7 with the diameter of 4.5 meters, may have a play 25 about 0.1% of the diameter of the flow tube 11.

At the impeller pump 3 shown in FIG. 1 the impeller 7 is mounted on the journal 21 of the impeller shaft 22 and the journal 21 is journalled in bearings in the hub 8 by means of the bearing arrangement 20 schematically shown. In a preferred embodiment, the bearing arrangement 20 comprises one or several slide bearings 26 mounted along the journal 21 and/or the impeller shaft 22. Suitably, the slide bearings 26 included consist of continuous radial bearings. The bearing arrangement 20 is carried by said radial rods 19 fixed within the hub cone 16.

Via the impeller 7, the water jet S directed astern produces a force of reaction F in the opposite direction that is transferred to the impeller shaft 22 possibly via the journal 21. This axial force of reaction F must be transferred to the hull of the ship 2, which is done by means of thrust bearings 27 in a way more closely described below. Only some limited parts of the shaft 22 are designed to be able to carry the enormous forces of pressure from the impeller 7 and this is done with the aid of one or several thrust bearings 27 located at a suitable distance from the impeller 7 itself.

Thus, during normal operation all of the axial forces of reaction F of the impeller shaft 22 including all other normally occurring axial forces and/or movements are carried by said thrust bearings 27. The play 25 between the impeller blades 24 and the inside 15 of the pump housing 4 remains almost constant, at least, all occurring movements stay within the limits of the admissible play 25. However, the play 25 might, as described above, be influenced by additional movements or external forces, that are not to be regarded as normally existing during normal operation, such as oscillations and vibrations caused by for example deformations of the hull of the ship 2 and the impeller shaft 22, tough sea conditions, foreign objects passing through the impeller chamber 9 and/or radial changes of position caused by defective mounting of the jet propulsion unit 1 and its propulsion engine. Said oscillations, movements and vibrations might result in such axial and/or radial changes of position result in the impeller blades 24 that they run the risk of contacting the inside 15 of the pump housing 4.

Figure 2:
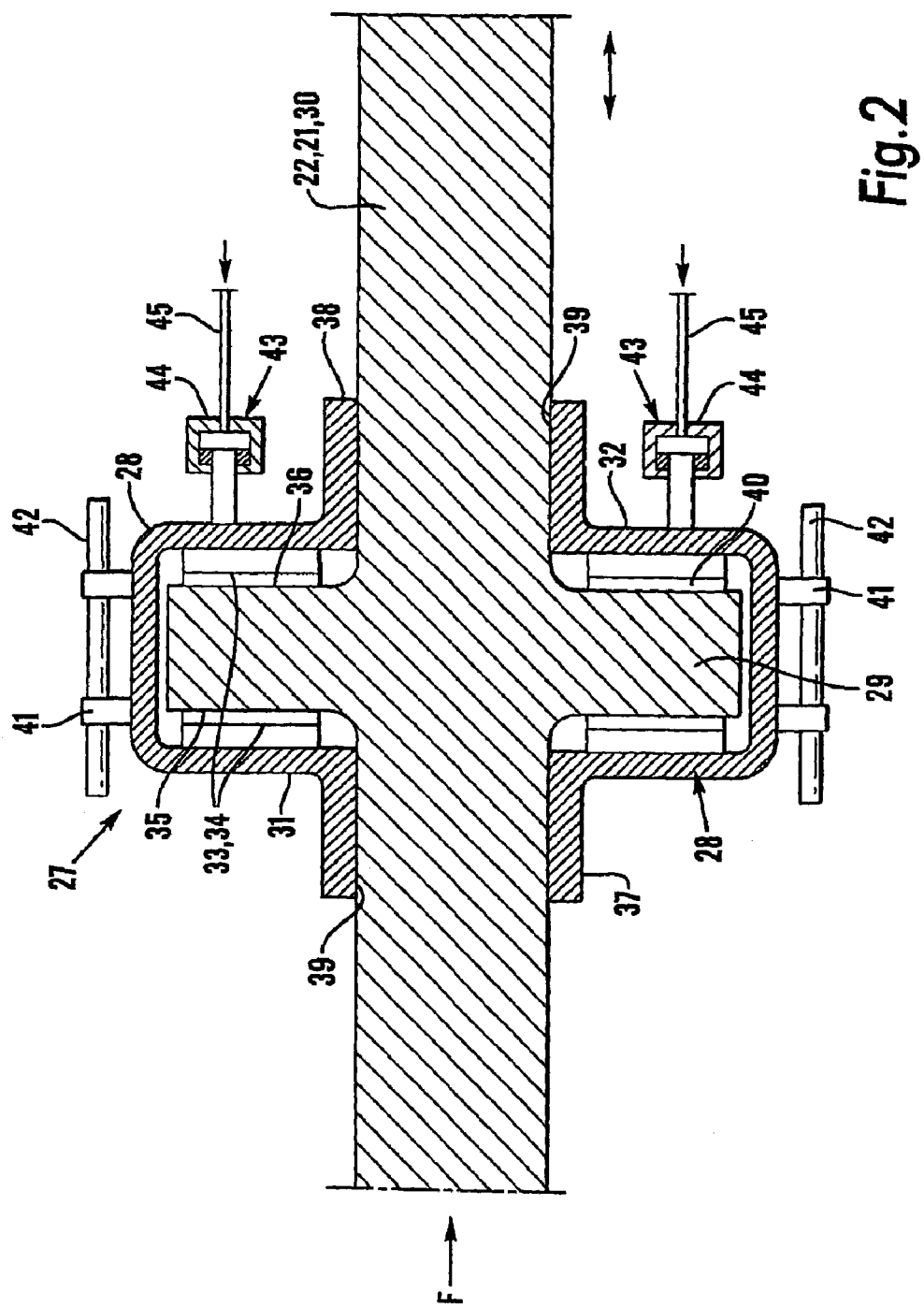
FIG. 2 is a schematic longitudinal section through parts of a thrust bearing according to a first embodiment, the thrust bearing being arranged at the impeller shaft according to FIG. 1 and by means of which an axial movement of the impeller relative the impeller chamber can be accomplished.
Figure 3:
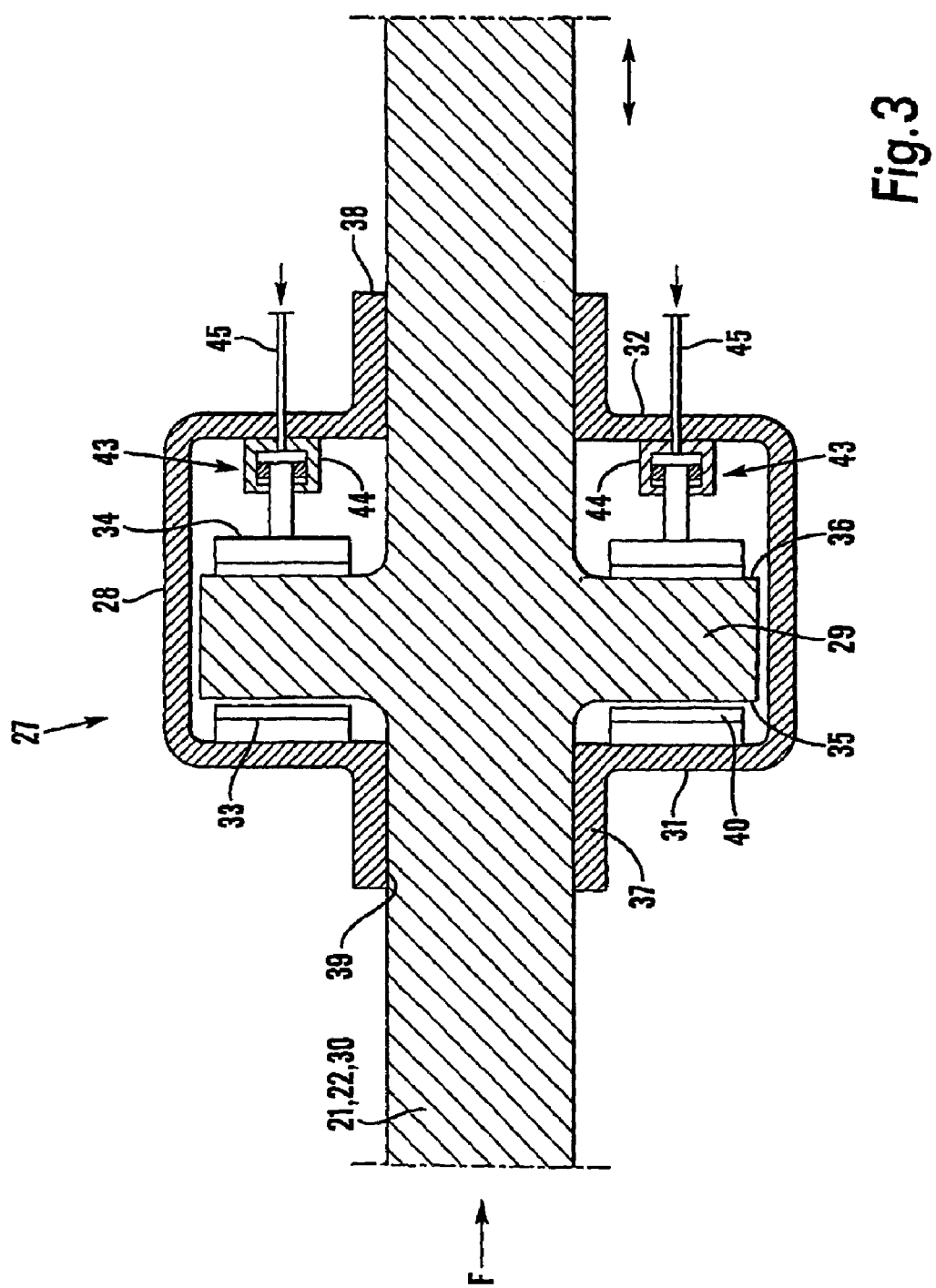
FIG. 3 is a schematic longitudinal section through parts of a thrust bearing according to a second embodiment of the present invention.

For this reason, either all of the thrust bearings 27 are arranged axially movable, according to a first design of the present invention, see FIG. 2, or certain parts of the thrust bearing 27 are arranged axially movable, a distance sufficient making this risk negligible or fully eliminated, according to a second design of the invention, see FIG. 3.

The thrust bearing 27 comprises a stabile bearing housing 28 surrounding and enclosing a bearing disc 29 that is preferably a radially protruding and circular part of the impeller shaft 22, the journal 21, or an intermediate shaft 30 especially adapted to the thrust bearing 27. The bearing housing 28 has a first and a second radial lateral surface 31, 32 arranged astern and afore and at the inside of each lateral surface 31, 32 one or several bearing supports 33, 34 are mounted. Alternatively, said bearing supports 33, 34 are arranged, also or instead, on one or both lateral surfaces 35, 36 of the circular bearing disc 29.

Also, the bearing housing 28 comprises two sealing flanges 37, 38 arranged at each side of the bearing housing 28 and journalled in bearings on the shaft 21, 22, 30 extending through the bearing housing 28 and rotating during drive, by means of a separate bearing arrangement 39, suitably comprising one or several radial bearings. The bearing supports (33,34) comprise bearing surfaces (40) consisting of for example Teflon segments, different composite materials, white metal and/or steel etc.

In the first embodiment (FIG. 2), the entire thrust bearing 27 is arranged to be axially movable along several rods 42 via several guides 41 arranged at the bearing housing 28. The rods 42 are arranged at a certain distance from and parallel with the shaft 21, 22, 30 extending through the bearing housing 28 and they are attached to the hull of the ship 2 in a suitable way.

In front of the bearing housing 28, i. e. afore, there are several adjusting devices 43 attached at the hull 2 to achieve the axial movement astern of the shaft 21, 22, 30, and by that also of the impeller blades 24, a distance sufficient that the play 25 will be large enough that the risk that undesired oscillations, movements and/or vibrations will result in such axial and/or radial changes of position of the impeller blades 24 that they run the risk of contacting the inside 15 of the pump housing 4 will be negligible or fully eliminated.

Preferably, each adjusting device 43 comprises at least one hydraulic or pneumatic cylinder 44 but some of, or all the adjusting devices 43 may also be mechanical adjusting devices comprising one or several electric engines (not shown).

Unlike in the first embodiment, the bearing housing 28 in the second embodiment (FIG. 3) is fixed to the hull 2 in a suitable way (not shown). Here, the adjusting devices 43 are mounted at the inside of the bearing housing 28, more exactly, between the inside of the afore arranged radial lateral surface 32 of the bearing housing 28 and the bearing disc 29. In the embodiment shown in FIG. 3 the adjusting devices 43 are hydraulic or pneumatic cylinders 44 that have a joint of pipe 45 for compressed air and hydraulic oil respectively through said lateral surface 32. However, one, several or all of the adjusting devices 43 shown may instead be constituted by the above-mentioned mechanical adjusting devices. Otherwise, the movement of the bearing disc 29, the shaft 21, 22, 30, the impeller 7, the impeller blades 24 and by that the change of the play 25 is achieved in the same way as in the above first embodiment.

It is understood that when a smaller play 25 is once more desirable a reduced pressure in the cylinders 44 will result in the force of reaction from the impeller pump 3 forcing the shaft 21, 22, 30 and by that the bearing disc 29 in the thrust bearing 27 afore. However, when mechanical adjusting devices 43 are being used, the change is done, in the same way as the increase of the play 25, but in the opposite direction. It is understood that in the case the impeller drive is not activated for achieving the movement afore, additional adjusting devices 43 may instead be mounted astern of the bearing housing 28 for achieving the same function as at the aforedescribed adjusting devices 43, but in the opposite direction.

Description of Function

According to the invention, the function and the use of the axially adjustable or movable thrust bearing 27 for the jet propulsion unit 1 is as follows:

During normal operation, the force of reaction of the impeller 7 is carried by the thrust bearing 27 at the setting of the play 25 that is suitable for normal operation. The adjusting devices 43 will be activated either automatically or manually when there is an increasing risk of damages due to a play 25 that is too small in view of the present or expected oscillations, vibrations, movements or conditions, or if such movements etc. are detected. The adjusting devices 43 move either the entire bearing housing 28 including the bearing disc 29, or the bearing disc 29 only, and thereby the shaft 21, 22, 30 astern, which in its turn increases the play 25 between the impeller blades 24 and the inside 15 of the pump housing 4 due to the spherically shaped and astern widening impeller chamber 9.

Alternative Embodiments

Thus, the invention is in no way limited to the specifically disclosed embodiments, but every other configuration according to the aforedescribed comes within the inventive concept.

For example, it is understood that instead of a conventional, homogeneous steel shaft the impeller shaft 22 may fully or partly comprise composite material such as glass fibre, coal fibre, plastics etc. Furthermore, it is understood that the other parts of the jet propulsion unit 1, may be made of composite- or light material, such as coal fibre etc. when it is considered suitable. Bearing surfaces and surfaces exposed to erosion are suitably provided with preventive coating, for example by polyurethane. Naturally, combinations of above mentioned materials or of other materials, here not mentioned but with similar characteristics, may occur.

Also, it is understood that when some kind of cylinder arrangement for the movement is used, the design gains a certain dampening function. The above-described bearings comprised by the bearing arrangement 20, 39 may be either water- or oil lubricated.

Finally, it is understood that also the number, dimensions, material and shape of the elements and details comprised by the jet propulsion unit 1 must be adapted according to the ship and the other prevailing demands and conditions. This also applies to the number of jet unit propulsions 1 mounted at the ship in question.

What is claimed is:

1. Jet propulsion unit (1) for propulsion of a waterborne craft comprising at least one impeller pump (3) with a pump housing (4) being an integrated part of the hull in which an impeller shaft (22) or a journal (21) connected to said impeller shaft (22) is rotatably journalled with respect to a bearing arrangement, and an impeller (7), having impeller blades (24), the impeller (7) being fixed to said impeller shaft (22) or journal (21) so as to follow the rotation of the impeller shaft (22), the impeller blades (24) being arranged at the impeller (7) with a play (25) between each impeller blade (24) and the inside (15) of the pump housing (4), characterized in that the jet propulsion unit (1) also comprises an axially adjustable thrust bearing (27) separate from the bearing arrangement and arranged to cooperate wit the impeller shaft (22) for adjusting said play (25), and that the thrust bearing (27) comprises a bearing housing (28) surrounding and encasing a bearing disc (29) connected to or cooperating with the impeller shaft (22), further characterized in that said bearing housing (28) is arranged to be axially movable by means of adjusting devices (43) a distance sufficient for the play (25) between the impeller blades (24) and the inside (15) of the pump housing (4) to stay within the limits of a maximally and minimally admissible play of the blades (25).

2. Jet propulsion unit according to claim 1, characterized in that rods (42) are attached at a distance from and parallel with the shaft (21, 22, 30) extending through the bearing housing (28) and that the bearing housing (28) is axially movable along the rods (42) by means of guides (41).

3. Jet propulsion unit according to claim 1, characterized in that the thrust bearing (27) comprises a bearing housing (28) fixed relative to the hull of the ship (2) and surrounding and encasing a bearing disc (29) connected to or cooperating with the impeller shaft (22), the bearing disc (29) being arranged to be axially adjustable by means of adjusting devices (43) a distance sufficient for the play (25) between the impeller blades (24) and the inside (15) of the pump housing (4) to stay within the limits of a maximally and minimally admissible play of the blades (25).

4. Jet propulsion unit according to claim 3, characterized in that the adjusting devices (43) are mounted inside the bearing housing (28).

5. Jet propulsion unit according to claim 1, characterized in that the adjusting devices (43) comprise at least one hydraulic or pneumatic cylinder (44).

6. Jet propulsion unit according to claim 5, characterized in that some of or all the adjusting devices (43) are made of mechanical adjusting devices.

7. Jet propulsion unit according to claim 1, characterized in that the bearing disc (29) is a radially protruding part of the impeller shaft (22), the journal (21), or an intermediate shaft (30) especially adapted for the thrust bearing (27) and connected to the impeller shaft (22).

8. Jet propulsion unit according to claim 1, characterized in that the bearing housing (28) comprises one or several bearing supports (33, 34).

9. Jet propulsion unit according to claim 9, characterized in that the bearing supports (33, 34) comprise bearing surfaces consisting of e.g. Teflon segments, different composite materials, white metal and/or steel etc.

10. Jet propulsion unit according to claim 4, characterized in that the adjusting devices (43) are hydraulic or pneumatic cylinders (44) that have a joint of pipe (45) for compressed air and hydraulic oil respectively through one of the lateral surfaces (31, 32) of the bearing housing (28).

11. Jet propulsion unit according to claim 1, characterized in that the maximally and minimally admissible play of the blades (25) is determined according to real or expected axial and/or radial changes of position of the impeller blades (24).

12. A jet propulsion unit for propulsion of a waterborne craft, comprising:

at least one impeller pump;

a pump housing;

an impeller shaft rotatably journalled with respect to a bearing arrangement;

an impeller comprising impeller blades;

an axially adjustable thrust bearing separate from the bearing arrangement and housed in a bearing housing, and bearing housing adjusting devices for axially moving the bearing housing a distance sufficient to adjust the play to stay within the limits of a maximally and minimally admissible play of the impeller blades, the impeller fixed to the impeller shaft, or fixed to a journal connected to the impeller shaft, to follow rotation of the impeller shaft, the impeller blades arranged at the impeller with play between each impeller blade and an inner portion of the pump housing, the axially adjustable thrust bearing arranged to cooperate with the impeller shaft for adjusting the play.

13. The jet propulsion unit of claim 12, wherein the bearing housing adjusting device comprises rods attached at a distance from and parallel with the shaft and extending through the bearing housing such that the bearing housing is axially movable along the rods by means of guides.

14. The jet propulsion unit of claim 12, further comprising a bearing disc connected to or cooperating with the impeller shaft, wherein the thrust bearing housing is fixed relative to the hull of the ship and surrounds and encases the bearing disc.

15. The jet propulsion unit of claim 14, further comprising adjusting devices for axially adjusting the bearing disc a distance sufficient for the play to stay within limits of a maximally and minimally admissible play of the blades.

16. The jet propulsion unit of claim 15, wherein the adjusting devices are mounted inside the bearing housing.

17. The jet propulsion unit of claim 12, wherein the adjusting devices comprise at least one hydraulic or pneumatic cylinder.

18. The jet propulsion unit of claim 17, wherein one or more of the adjusting devices comprise mechanical adjusting devices.

19. The jet propulsion unit of claim 12, wherein the bearing disc comprises a radially protruding portion of at least one of the impeller shaft, the journal, and an intermediate shaft adapted for the thrust bearing and connected to the impeller shaft.

20. The jet propulsion unit of claim 12, wherein the bearing housing comprises one or more bearing supports.

21. The jet propulsion unit of claim 20, wherein the one or more bearing supports comprise bearing surfaces comprised of at least one of Teflon segments, different composite materials, white metal, and steel.

22. The jet propulsion unit of claim 15, wherein the adjusting devices comprise hydraulic or pneumatic cylinders having a passage for compressed air or hydraulic oil, respectively, through a lateral surface of the bearing housing.

23. The jet propulsion unit of claim 12, wherein the maximally and minimally admissible play of the blades is determined according to real or expected axial or radial changes of position of the impeller blade.

* * * * *